(12) United States Patent
Giaimo et al.

(10) Patent No.: US 7,522,551 B2
(45) Date of Patent: Apr. 21, 2009

(54) METHOD AND APPARATUS FOR WIRELESS ROUTING ON A PLURALITY OF DIFFERENT WIRELESS CHANNELS

(75) Inventors: Edward C. Giaimo, Bellevue, WA (US); John P. Pennock, Sammamish, WA (US); Paramvir Bahl, Sammamish, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/701,762

(22) Filed: Nov. 4, 2003

(65) Prior Publication Data

US 2004/0090924 A1 May 13, 2004

Related U.S. Application Data

(63) Continuation-in-part of application No. 10/428,218, filed on May 2, 2003, and a continuation-in-part of application No. 09/953,980, filed on Sep. 17, 2001, now Pat. No. 7,248,570, and a continuation-in-part of application No. 09/954,087, filed on Sep. 17, 2001, now Pat. No. 7,194,263.

(51) Int. Cl.
*H04W 4/00* (2006.01)
(52) U.S. Cl. .................... 370/328; 370/329; 370/338
(58) Field of Classification Search ............... 370/252, 370/338, 328, 329, 230, 245, 348, 395.5, 370/400, 401, 396, 395.21; 455/432.1, 450, 455/452.1, 452.2
See application file for complete search history.

(56) References Cited

U.S. PATENT DOCUMENTS

| | | | |
|---|---|---|---|
| 6,842,460 B1 * | 1/2005 | Olkkonen et al. | 370/465 |
| 6,912,373 B2 * | 6/2005 | Lee | 455/41.2 |
| 7,044,754 B2 | 5/2006 | Malin | |
| 7,194,263 B2 | 3/2007 | Bahl | |
| 7,248,570 B2 | 7/2007 | Bahl | |
| 7,379,447 B2 | 5/2008 | Dunagan | |
| 2002/0022453 A1 * | 2/2002 | Balog et al. | 455/41 |
| 2003/0005160 A1 * | 1/2003 | Schaefer | 709/248 |
| 2003/0036408 A1 * | 2/2003 | Johansson et al. | 455/560 |
| 2004/0218580 A1 | 11/2004 | Bahl | |
| 2007/0147338 A1 | 6/2007 | Chandra | |
| 2008/0207126 A1 * | 8/2008 | Grushkevich et al. | 455/41.2 |
| 2008/0222701 A1 * | 9/2008 | Saaranen et al. | 726/3 |

* cited by examiner

*Primary Examiner*—Chi H Pham
*Assistant Examiner*—Farah Faroul
(74) *Attorney, Agent, or Firm*—Workman Nydegger

(57) ABSTRACT

To provide enhanced quality of service (QoS) communication capability, a wireless network is implemented in which different channels are used for conveying different types of data and in which wireless devices are selectively operated in either an infrastructure or ad hoc mode automatically selected to make best use of the available communication bandwidth. For example, a wireless device for a computer can be operated selectively as a client wireless device that is in communication with a legacy access point in an infrastructure mode on one channel, while using one or more different channels to communicate selectively in either ad hoc mode or infrastructure mode with client devices. To make efficient use of wireless devices, IEEE 802.11a or 802.11g wireless devices are used for communicating audio/video data on one channel, while an IEEE 802.11b wireless device is used on a different channel for communicating web page data.

22 Claims, 9 Drawing Sheets

METHOD AND APPARATUS FOR WIRELESS ROUTING ON A PLURALITY OF DIFFERENT WIRELESS CHANNELS

RELATED APPLICATIONS

This application is a continuation-in-part of prior U.S. patent applications, Ser. No. 10/428,218, filed May 2, 2003, Ser. No. 09/953,980, filed Sep. 17, 2001 now U.S. Pat. No. 7,248,570, and Ser. No. 09/954,087, filed Sep. 17, 2001 now U.S. Pat. No. 7,194,263, the benefit of the filing dates of which is hereby claimed under 35 U.S.C. § 120.

FIELD OF THE INVENTION

The present invention generally relates to the routing of wireless communications through a client on a wireless network, and more specifically, pertains to a method and a system for employing a client device to communicate with a plurality of other wireless devices on different channels, to route communications from one wireless AP to another wireless device, or to enhance communications with the other wireless devices.

BACKGROUND OF THE INVENTION

Wireless communications have become increasingly common for networking client devices together in offices and homes. An example of a simple conventional wireless network 10 is shown in FIG. 1A. Wireless network 10 includes a wireless base station/Ethernet switch 12 that also functions as a router. This base station is coupled to a cable modem or digital subscriber line (DSL) modem 14 and enables each client computing device on a local area network (LAN) to share a broadband Internet connection to Internet 16. The base station may include several Ethernet switch ports for use in connecting to wired client computing devices. For example, one such port is shown connected by an Ethernet cable 20 to a personal computer (PC) 18a having a monitor 18b and a keyboard 18c. The network also includes a computer 22a (with a monitor 22b and a keyboard 22c), a laptop 24, and another computer 26a (with a monitor 26b and a keyboard 26c); and each of these client computing devices are in wireless communication with the base station.

Although existing Institute of Electrical & Electronics Engineers (IEEE) 802.11 equipment is well suited for browsing the Internet and sharing bulk data such as computer files, it does not handle the real-time streaming of audio/video (A/V) particularly well. This is becoming an increasingly important concern, because users are capturing and storing photos, music, and video in consumer electronic devices and PCs to a greater extent and have expressed the desire to organize, display, and playback this information on existing electronic devices such as TVs, stereos, telephones, and other types of consumer electronic (CE) devices that can be coupled to a network. The most convenient way of connecting these devices in an existing office or home environment is wirelessly, using low-cost IEEE 802.11 (Wi-Fi) equipment.

Wireless networks can employ several different frequency bands and data rates, with different nominal transmission characteristics, depending upon the standard employed. These different standards are all encompassed under the IEEE 802.11 specification that generally defines how wireless networks operate. Thus, the IEEE 802.11a standard provides for transmissions at 5 GHz and data rates up to 54 Mbps using Orthogonal Frequency Division Multiplexing (OFDM), while the more ubiquitous IEEE 802.11b standard, which provides for transmissions at 2.4 GHz and data rates up to 11 Mbps, using direct sequence spread spectrum modulation. The recently approved IEEE 802.11g standard is an extension of the IEEE 802.11b standard and also employs data rates up to 54 Mbps within the 2.4 GHz band, using OFDM technology. Wireless devices that are compliant with the 802.11g standard are also compliant with the 802.11b standard, and some wireless devices are now available that are universally compliant with all three standards.

However, mixing devices designed for different IEEE 802.11 standard data rates typically has a significant disadvantage. Specifically, use of an 802.11b compliant wireless device on a conventional wireless LAN that has wireless devices with 802.11g capabilities causes the network to operate inefficiently, substantially reducing the data rate of all of the 802.11g wireless devices on the LAN. The current standard allocates bandwidth poorly, allowing an equal number of packets for each client. Thus, as indicated in FIG. 2A, a first wireless device that employs the 802.11g standard may transmit a 1500 byte data packet 30 at up to 54 Mbps, and then must wait while a second wireless device transmits a 1500 byte data packet 32 at about 1 Mbps using the 802.11b standard (note that the nominal maximum 802.11g data rate, 54 Mbps, and 802.11b data rate, 11 Mbps, are typically not achieved due to signaling overhead, compression, error correction, collision detection, propagation conditions or distance between the second wireless device and the intended recipient). As a result, the effective throughput and latency on this radio channel is degraded. The first wireless device data packets are still being transmitted at 54 Mbps, but must wait for a 1 Mbps packet to be sent before the next packet can be sent at 54 Mbps. In the time the first device is waiting for the 1 Mbps packet, it could have sent another 54 times (i.e., 54 Mbps/1 Mbps) more packets, each containing 1500 bytes!Effectively, the first device's throughput is reduced to 1 Mbps (54 Mbps * 1/55), since it can only send one packet in the same time it normally would have sent 55 packets. Similarly, the second wireless device throughput is still 1 Mbps, but is slightly less since it must wait for the 54 Mbps packet (1 Mbps * 54/55). If the two effective throughputs are added together, the sum is an aggregate link speed of 2 Mbps.

To address this latency problem, it has been proposed that the 802.11 specification be changed so that a higher speed wireless device is able to transmit more data packets before the channel is released to a slower speed wireless device. This so-called "Burst Mode" solution can be understood by reference to FIG. 2B, where the first wireless client device is enabled to transmit "N" 1500 byte data packets 30 at 54 Mbps before the wireless channel is made available to the second, slower wireless device to transmit one 1500 byte data packet 32 at the lower data rate. For example, when burst mode "N" is 10 packets, the effective throughput for the 54 Mbps device is improved from 1 Mbps to about 8.5 Mbps, but is still at only 16% of the nominal maximum. The 1 Mbps device throughput is decreased to about 0.8 Mbps, for a total aggregate link speed of about 9.3 Mbps. Also, this solution requires the use of jitter buffers for data storage of packets in order to "average out" the impact of slower wireless devices on the data rate of higher speed wireless devices.

A better approach would be to segregate wireless devices of the same general bandwidth requirements and payload types on independent wireless channels. For example, all of the wireless devices that transmit/receive at a slower speed might be assigned to Channel A, while those that transmit/receive at a higher speed are assigned to Channel B. Channel A would thus have a high latency and low throughput, but Channel B would have a low latency and high throughput.

Channel A would thus be more suitable for transferring conventional web pages or audio data, while Channel B would be more suitable for transferring video data packets. Devices operating on either channel could approach a much higher efficiency, i.e., two devices competing on a pure 54 Mbps channel without burst mode would each be 50% efficient. However, enabling communication between the wireless devices operating on the different channels creates problems for conventional wireless devices used on typical wireless networks. Wireless APs and wireless clients usually contain only one radio (transmitter/receiver) and are therefore only able to maintain one radio channel at a time. There is currently no provision in the art for seamlessly communicating data packets between client devices that operate on different channels with a single radio.

Another problem that has not been addressed in the prior art is that wireless traffic from one wireless client to another wireless client on the same AP in an infrastructure network must travel first to the AP before reaching the intended client, causing the data to be transmitted and received twice. Further, all the wireless clients of the AP compete for the same bandwidth since they use the same wireless channel. These problems are particularly prevalent in single AP networks, such as homes or small businesses, but can also be found in multiple AP networks. Typically, a wireless home network 10 with a single AP 12 in infrastructure mode might appear as shown in FIG. 1A.

As shown in FIG. 1A, all of the clients are associated with the AP on the same channel. In order for client 1 to communicate with client 2, it must transmit to the AP first, and the AP must retransmit to client 2. Even if the link is unused, this arrangement effectively halves the throughput, since the data travels through the AP, and the AP cannot simultaneously receive and transmit on the same channel. So, if client 1 and client 2 were both associated to the AP on channel 1 at a rate of 54 Mbps, the nominal maximum rate they can transmit to each other is 27 Mbps. Further, if one of the other clients is transmitting data at the same time, the transmission competes with the other clients on both "hops." For example, if client 3 were transmitting during the time that client 1 is transmitting to client 2 via the AP, the throughput is degraded by another 50% on each hop, creating an overall throughput of about 13.5 Mbps. If both client 1 and 2 are within wireless range of one another, a better approach is for client 1 to transmit directly to client 2 on a different independent channel at the full 54 Mbps. There is currently no provision in the art for an infrastructure network as shown in FIG. 1A to statically or dynamically allocate a new channel between clients 1 and 2 and still remain a part of the network.

A related problem that also has not been addressed in the prior art is the ability to automatically enable wireless devices to selectively communicate in an infrastructure mode (like the exemplary conventional wireless network 10 in FIG. 1) and in an ad hoc mode 36, as shown in FIG. 3. In the ad hoc mode, client 1 is directly in wireless communication with client 2, without need for an AP or base station to serve as a central point to facilitate communication between the two wireless device. In the infrastructure mode, wireless client devices currently communicate with a selected AP or a base station on a single channel, as shown in FIG. 1A. Also, in infrastructure mode, data packets communicated between a first wireless client device and a second wireless client device must be transmitted through an AP or base station and then to the intended recipient. This centralized approach uses twice the bandwidth that would be required if the first wireless device were instead to communicate the data packets directly to the second wireless client device in ad hoc mode. The first and second wireless client devices currently cannot be automatically selectively operated in the infrastructure mode or ad hoc mode. Instead, a user at each client wireless device typically manually employs a configuration program to change the mode in which the wireless client device is operating each time a change from one mode to the other is desired. Also, to avoid using the bandwidth of other wireless devices that are communicating in the infrastructure mode, two wireless devices that are communicating in the ad hoc mode should use a different channel than those communicating in the infrastructure mode, and this channel is typically manually selected when manually changing the mode of a wireless device to the ad hoc mode.

The problems discussed above become more apparent when the existing wireless technology is used to address the new Quality of Service (QoS) standards being developed by the IEEE 802.11e Working Group. These new standards provide methodologies for delivering end-to-end streaming of data from servers to clients. Practically speaking, deploying these new standards using existing wireless equipment and communication techniques is a challenge. Also, engineering and testing a full end-to-end system capable of conveying such a variety of data is a daunting task. A new technology or approach is needed to enable a modular and smooth migration from legacy non-QoS systems to the full QoS systems of the future.

Thus, there is clearly a need for wireless data systems that automate the selection of channels and the wireless modes used, the determination as to whether to operate as an AP or a client device, and the data rates employed on specific channels, to optimize the use of the available bandwidth as a function of the type of data being communicated and the needs of specific wireless devices that are communicating. Currently, the IEEE 802.11 specification of itself does not provide an acceptable solution to the problems discussed above, and the solutions that have been proposed in the prior art to address these problems are either incomplete or inadequate.

SUMMARY OF THE INVENTION

In consideration of the inefficiency that exists in current wireless networks with wireless devices having different data rate capabilities and the need to transfer different types of data, the present invention makes more effective use of the available bandwidth by enabling the wireless devices to connect directly to each other on an independent wireless network, either temporarily or permanently, for the purposes of increased QoS in data transfers. The present invention creates more efficient variations than the typical star-topology with a wireless AP at the center and its wireless clients all communicating through the AP at the hub. Further, the present invention provides ways to create efficiencies without enhancing every element in the system, so that the wireless network can continue to operate with current state of the art devices. The devices are allowed to directly connect to each other in either ad hoc or infrastructure modes, as most appropriate, and also devices of like data rate are enabled to communicate, as appropriate for transferring specific types of data. It is not necessary for a user to manually selectively operate a wireless device in a particular mode when communicating with a selected other wireless device, because the present invention automatically facilitates the communication protocol between two wireless devices when needed.

A first aspect of the present invention is directed to a method for achieving a better use of available wireless communication bandwidth and is called "Smart Wireless Routing." The Smart Wireless Routing method includes the step of employing an infrastructure mode for wireless communication between a wireless AP and a first wireless client device on a first wireless channel. In response to a need to communicate data between the first wireless client device and a second wireless client device, a wireless communication with the second wireless client device is selectively automatically enabled in an ad hoc or infrastructure mode over a second wireless channel that is at a different frequency than the first wireless channel. If ad hoc mode is used for the second wireless channel, the first wireless device is a peer of the second wireless device and the mode of communication is called "Smart Wireless Routing Ad Hoc Mode." If infrastructure mode is used, the first wireless device acts as a "surrogate" AP for the second wireless device and operates in "Smart Wireless Routing AP" mode. Smart Wireless Routing AP mode has additional advantages compared to the ad hoc mode. For example, additional wireless devices beyond the second wireless device can connect to the first wireless device. Also, if additional wireless devices do not support an ad hoc connection, or cannot automatically switch from operating as an infrastructure wireless client to an ad hoc peer-to-peer client, the first wireless device can operate in infrastructure mode as it did with the original AP. Data are then communicated between the first wireless client device and the second wireless client device over the second wireless channel, using this new direct connection. This aspect of the present invention is clearly illustrated in a wireless network 10' in FIG. 1B.

As was noted in the discussion of FIG. 1A, there are disadvantages in using the current state of the art when clients 1 and 2 need to exchange data. First if both remain associated to the AP, the effective bandwidth is halved because the data must travel on two "hops." Second, if other wireless clients such as clients 3, 4, 5, or 6 are communicating at the same time that wireless clients 1 and 2 are in communication, there is competition for bandwidth and overall QoS is degraded. In the present invention, the first wireless client is designed to enable it to remain associated with the AP in infrastructure mode, while creating either a new independent ad hoc connection to a second client or presenting itself as a "surrogate" AP that provides an infrastructure connection for other wireless clients. In FIG. 1B, client 1 is operating in Smart Wireless Routing ad hoc mode with client 2, while client 5 is operating in Smart Wireless Routing AP mode with clients 4 and 6. This improvement alleviates the problems discussed above. First, data being communicated to the Smart Wireless Routing device form the secondary clients does not require the extra "hop" through the AP. The bandwidth can then be fully utilized so that communication occurs at full speed and is not halved. Second, the new wireless connection is on an independent channel so that wireless traffic from other clients does not compete for bandwidth or disturb the QoS. Further, the new wireless channels can optimize the link's QoS for the specific type of data that is to be communicated. For example, if client 1 and client 2 commonly share bandwidth intensive media files, the QoS of the direct connection can be optimized for media streaming. If clients 4, 5, and 6 commonly need low-latency gaming data to be exchanged, the QoS for that channel can be optimized for real-time gaming data.

The method also provides for simultaneous maintenance of two wireless connections on two independent channels in the first wireless client device with Smart Wireless Routing. The wireless device maintains one channel to the network AP (infrastructure mode) and another channel, either in "surrogate" AP (infrastructure) mode or in peer-to-peer (ad hoc) mode, to the secondary wireless device(s). One channel is linked to the network AP (infrastructure mode) and another channel, with the first client device operating either in "surrogate" AP (infrastructure) mode or in peer-to-peer (ad hoc) mode, linked to the second wireless device. The first wireless client device with Smart Wireless Routing can subsequently be automatically changed to operate in the ad hoc mode for retransmitting buffered data packets that have previously been received by the first wireless client device from the wireless AP, to the second client wireless device. The first wireless client device can be automatically changed to operate in the infrastructure mode for retransmitting buffered data packets to the wireless AP that have previously been received by the first wireless client device from the second wireless client device.

It may be that the second wireless client device is unable to directly communicate with the wireless AP at an acceptable data rate, e.g., due to intervening structural elements or because of distance. Instead, the present invention enables the second wireless client device to communicate with the wireless AP indirectly through the first client wire device. A different data rate can be employed for the communication between the wireless AP and the first wireless client device, than for the communication between first wireless client device and the second client device.

Different QoS link properties can be employed for communicating different type of data packets between the first wireless client device and the second wireless client device, than for the type of data packets communicated between the wireless AP and the first wireless client device, and may also be used for communicating different size of data packets between the first wireless client device and the second wireless client device, than between the wireless AP and the first wireless client device.

Optionally, a plurality of different wireless transmitters/receivers can be employed at the first wireless client device. In this case, one wireless transmitter/receiver is selectively set to operate in the infrastructure mode on the first wireless channel, and the other wireless transmitter/receiver is selectively set to operate in infrastructure or ad hoc mode on the second wireless channel. The method then further includes the step of transmitting instructions from the wireless AP to the first wireless client device to control operation of each wireless transmitter/receiver.

Another important function of the present invention is the ability to selectively operate a wireless device either as a client device or station that communicates with an AP or as an AP that manages its own set of client devices or stations. In a wireless network, additional APs can optionally be used, so that each AP preferably operates on a different wireless channel and is selectively coupled in communication with an external network over either a wire or a wireless link.

The method further includes the step of providing a plurality of servers that are each selectively automatically coupled in communication with an external network when communication with the external network is required. Data stored on the servers are then wirelessly communicated to wireless client devices from the servers over different wireless channels. The servers also preferably communicate with different wireless client devices on the different wireless radio channels using at least one of a plurality of different types of data, different sizes of data packets, different data rates, and different wireless communication standards. Each of the plurality of servers selectively communicates with an AP using the infrastructure mode and the first wireless channel, when communication with the external network is required.

Another aspect of the present invention is directed to a memory medium storing machine readable instructions for carrying out the steps of the method discussed above.

Still another aspect of the present invention is directed to a wireless AP that controls wireless client devices so as to efficiently use available bandwidth for wireless communications over a network. The wireless AP includes a memory in which machine instructions are stored, a wireless transmitter and receiver, which are capable of transmitting on a plurality of different wireless channels, and a processor that is coupled to the memory and which executes the machine instructions to carry out a plurality of functions. These functions include communicating with at least one of a first wireless client device and a second wireless client device on a first wireless channel, in an infrastructure mode, and in response to a need for wireless communication between the first wireless client device and the second wireless client device, transmitting a signal on the first wireless channel that causes the first wireless client device and the second wireless client device to establish a Smart Wireless Routing mode of wireless communication with each other on a second wireless channel that is different than first wireless channel.

Yet another aspect of the present invention is directed to a method for efficiently communicating data over a wireless network. For data being communicated between wireless devices, the method determines at least one of a type of data being communicated between specific wireless devices, a size of data packet to be communicated between specific wireless devices, a frequency band with which the data will be communicated, and a nominal data rate with which the data will be communicated. The wireless devices communicating different types of data are automatically caused to communicate over different wireless channels, so that a first wireless channel is used for communication of a first type of data between a first set of wireless devices, and a second wireless channel is used for communication of a second type of data between a second set of wireless devices. In addition, the method includes automatically enabling communication dynamically between selected pairs of wireless devices that are communicating the same type of data, and automatically enabling communication dynamically back to the original infrastructure mode for wireless devices that are communicating data from an external network through a central AP wireless device.

The method further includes the step of automatically changing selected wireless devices between communicating using the Smart Wireless Routing mode and communicating using the regular infrastructure mode in response to the type of data being transferred between the plurality of wireless devices.

Yet another aspect of the present invention is directed to a method for automatically selectively switching a wireless device between operating in an ad hoc mode and operating in an infrastructure mode when communicating with at least one other wireless device. The method includes the step of determining a type of data to be communicated between the wireless device and the other wireless device. In response to the type of data to be communicated, the wireless device is selectively automatically operated in a preferred one of the ad hoc mode and the infrastructure mode. For example, if the wireless device is communicating video data to another wireless device coupled to a video monitor, the wireless device might be operated in the ad hoc mode, while if communicating hypertext markup language (html) or Internet web page data to another wireless device coupled to a laptop computer, the wireless device might be operated in the infrastructure mode.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 1A:
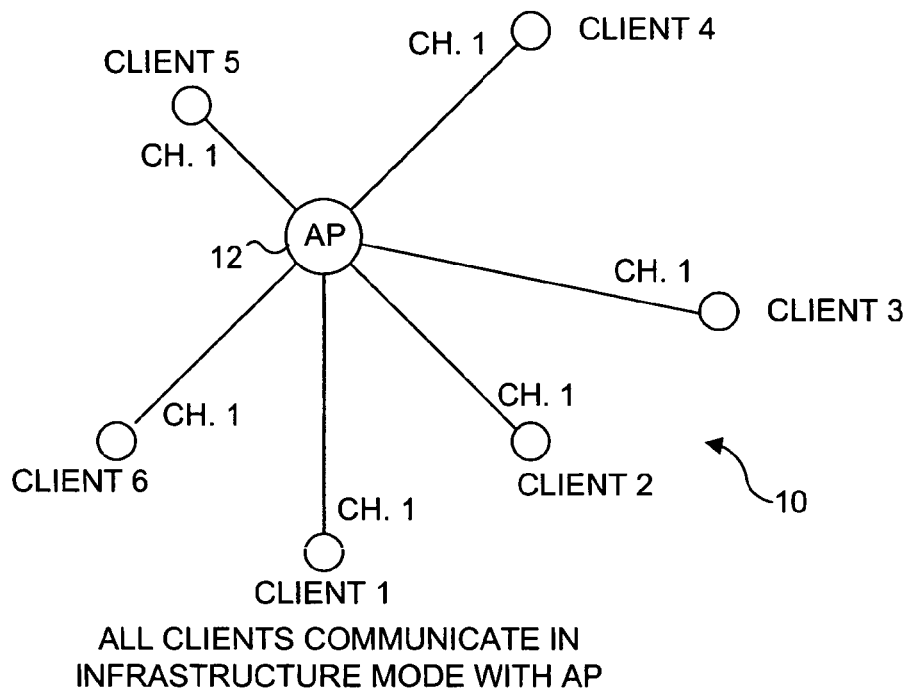
FIG. 1A (Prior Art) is a schematic diagram of a simple conventional wireless network that is coupled to the Internet and operates in infrastructure mode, on a single wireless channel.
Figure 1B:
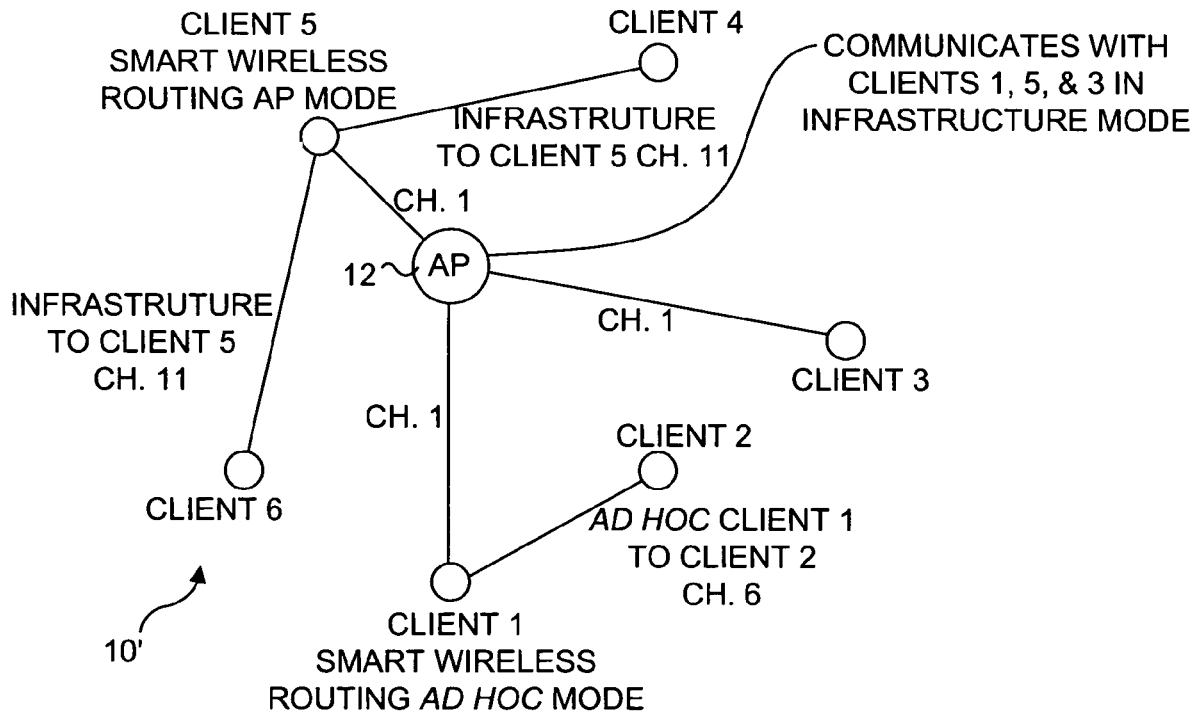
FIG. 1B is a schematic diagram illustrating how the present invention enables a wireless device to operate either as a wireless client device or as a "surrogate" AP in communicating either in infrastructure mode or ad hoc mode with another wireless client device.
Figure 2A:
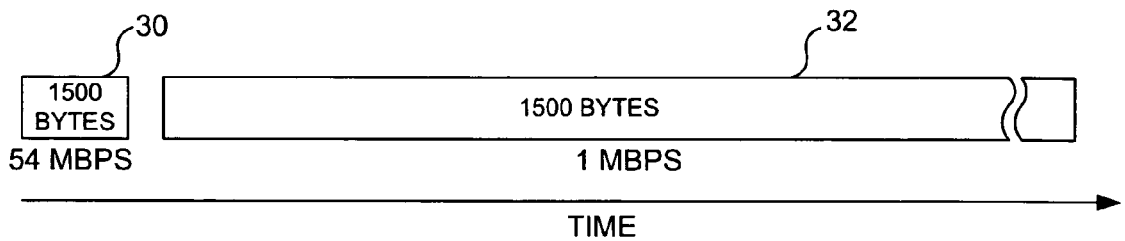
FIG. 2A (Prior Art) is a schematic diagram illustrating the poor bandwidth allocation of a conventional wireless AP communicating with clients of differing data rate capability.
Figure 2B:
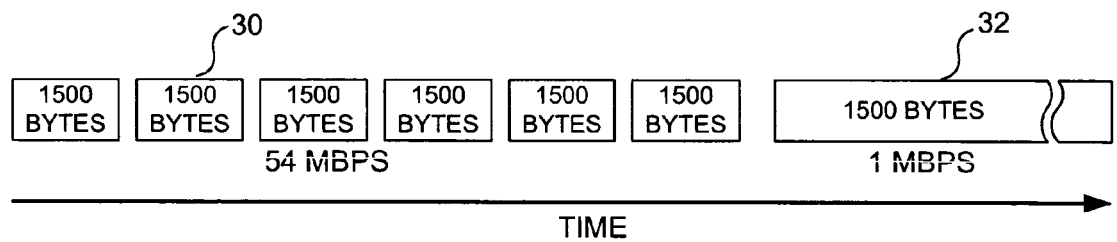
FIG. 2B (Prior Art) is a schematic diagram illustrating a proposal to modify the bandwidth allocation used in FIG. 2A to improve latency, but providing insufficient throughput.
Figure 3:
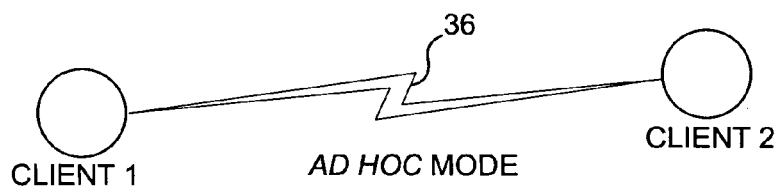
FIG. 3 (Prior Art) is a schematic diagram showing a pair of computing devices coupled in wireless communication in the ad hoc mode.
Figure 5:
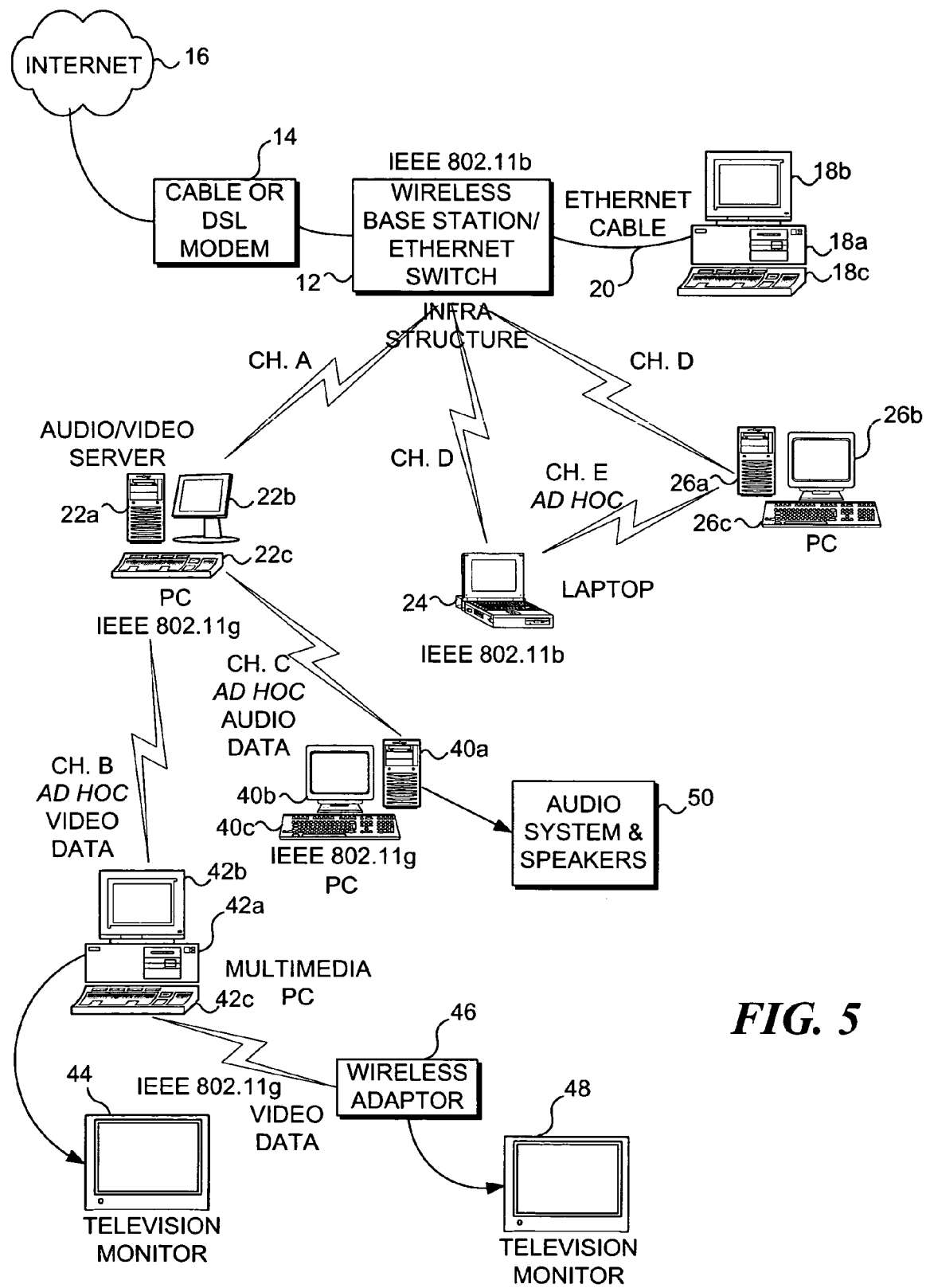
Figure 6:
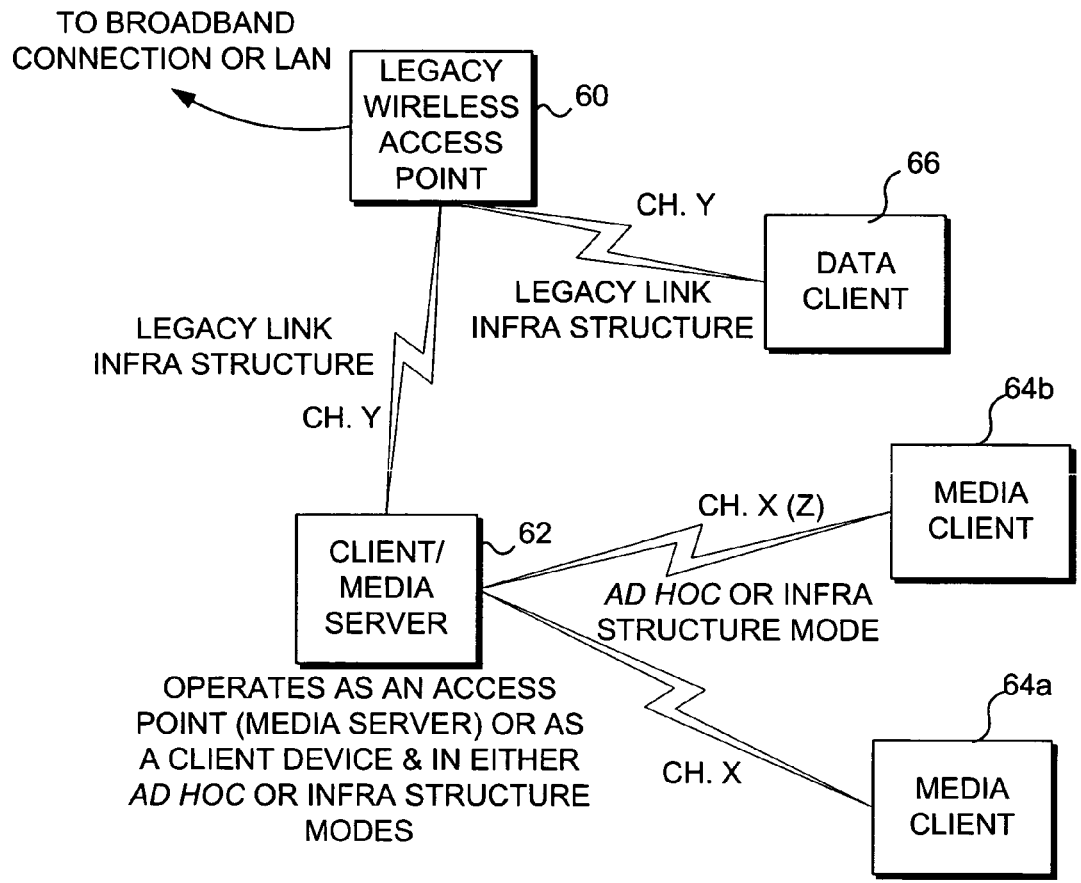
Figure 7:
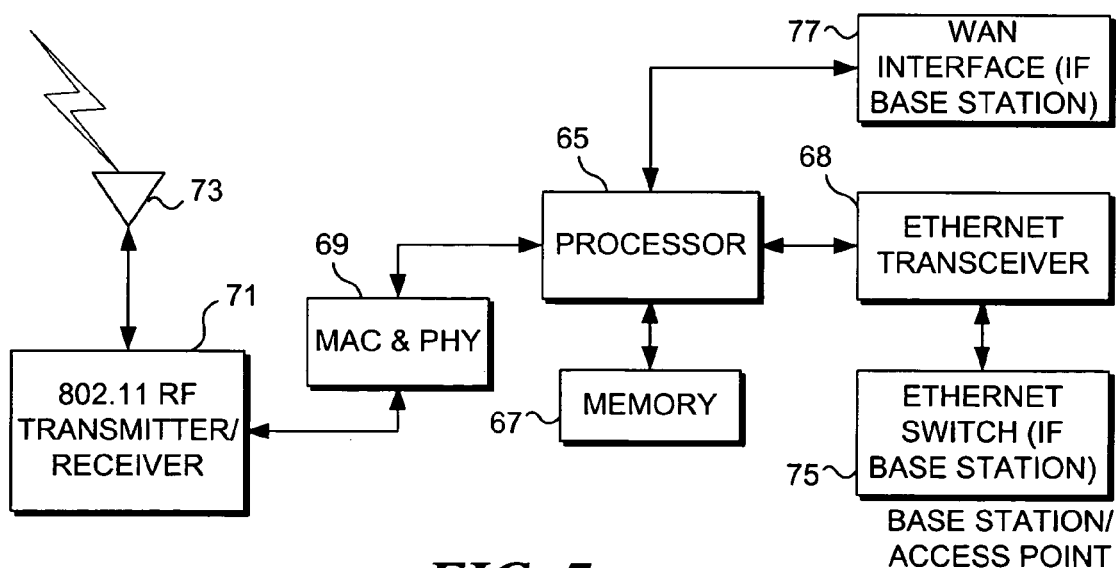
Figure 8:
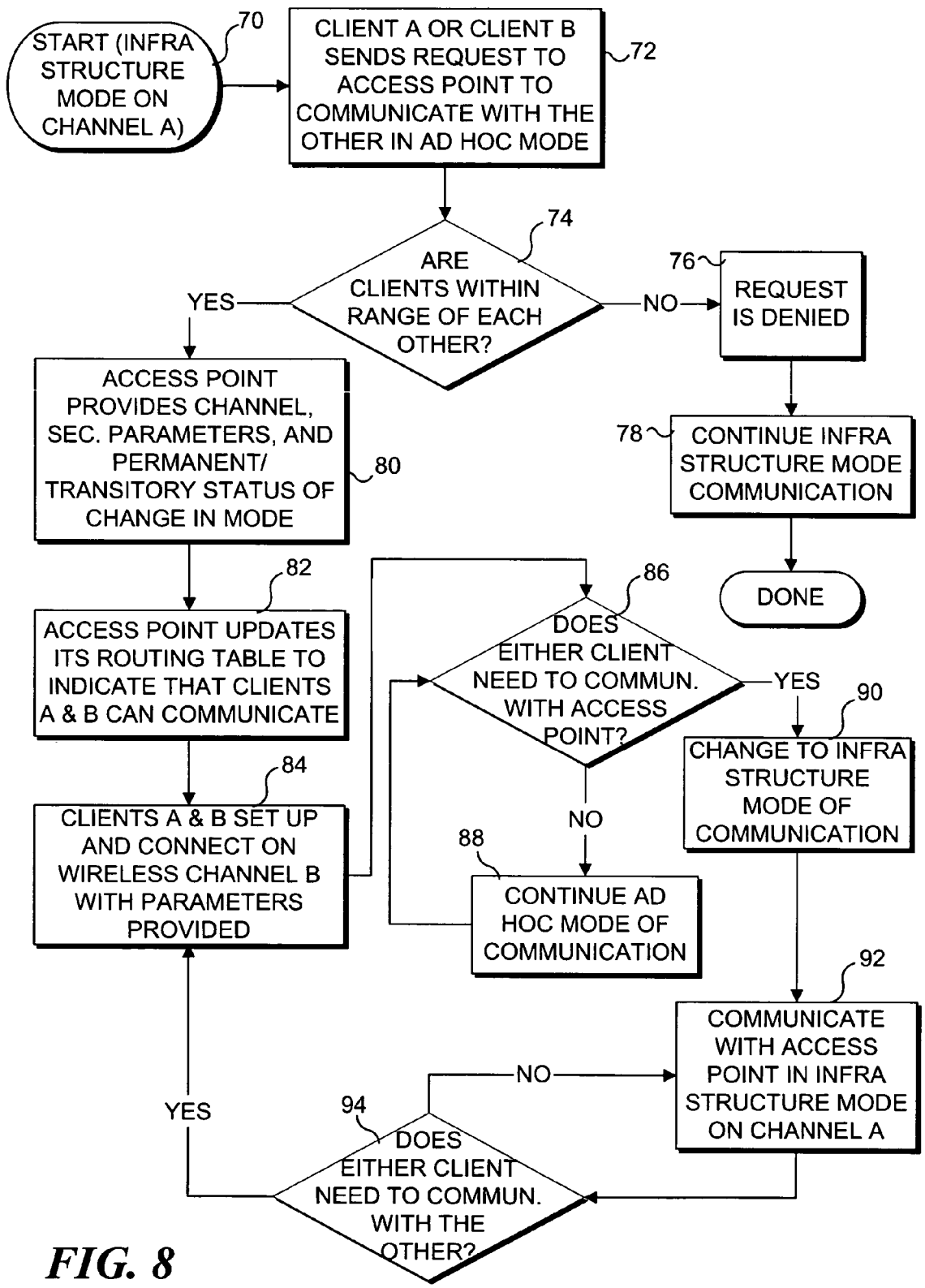
Figures 9, 10, 11:
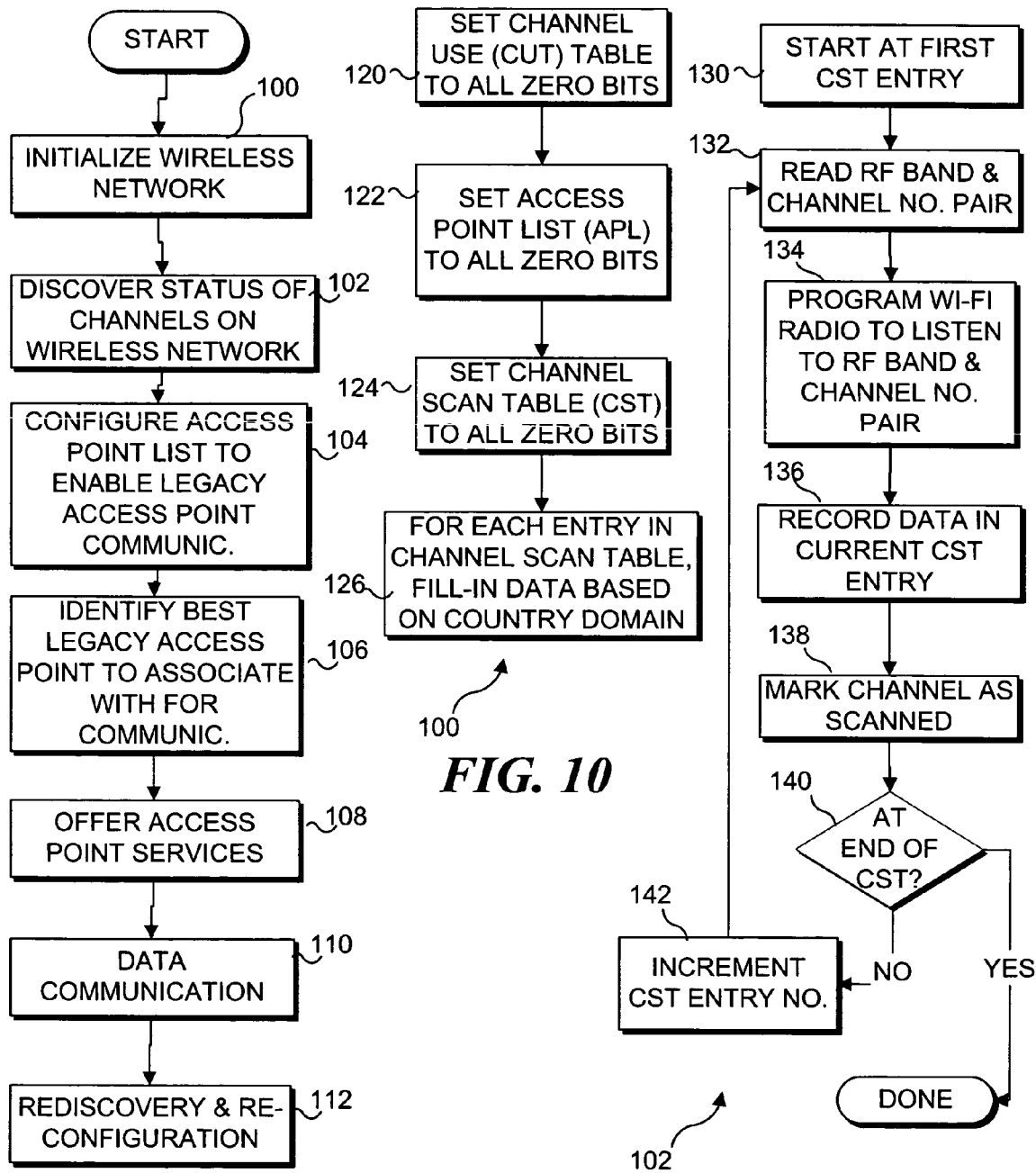
Figure 12:
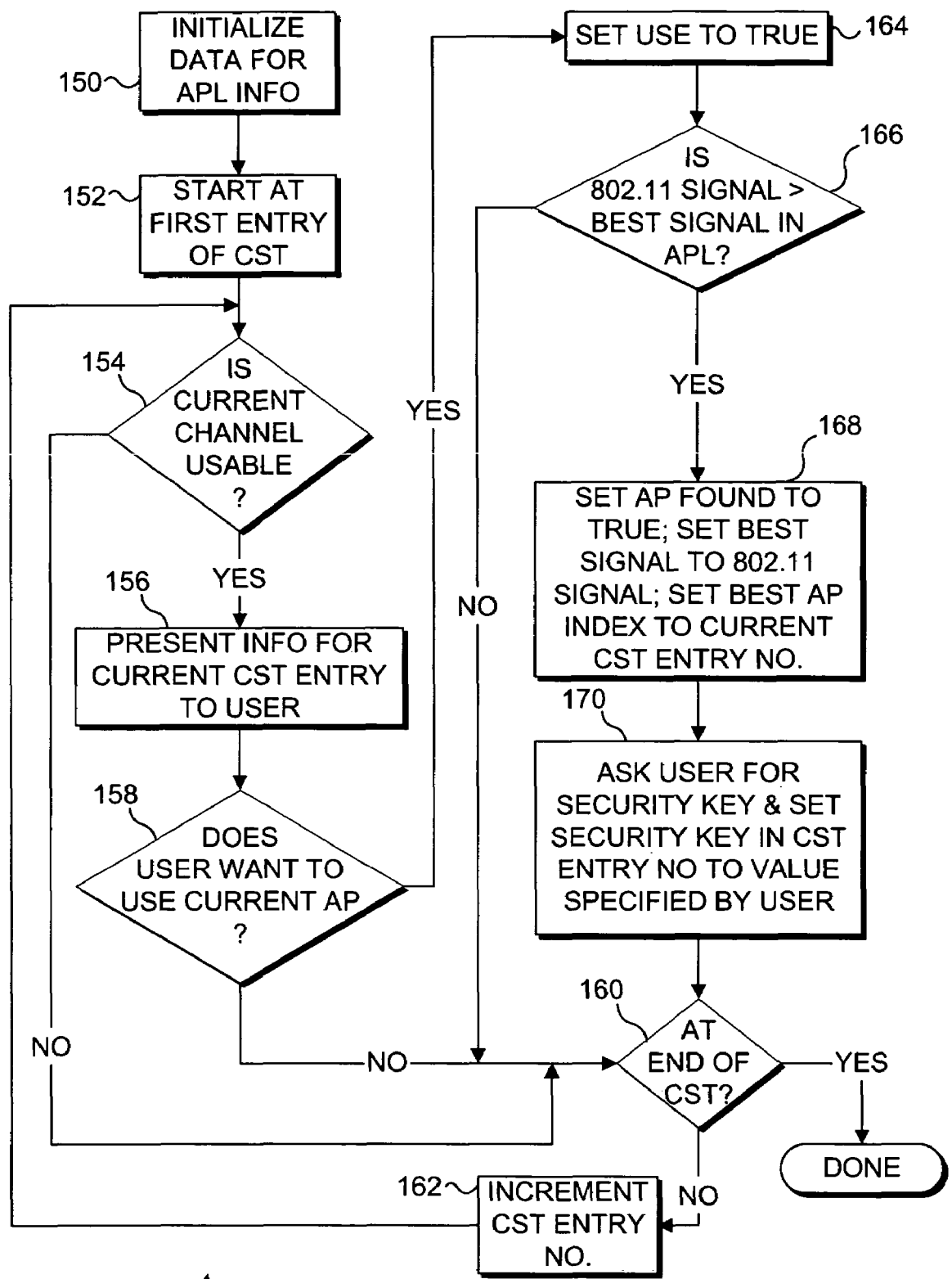
Figure 13:
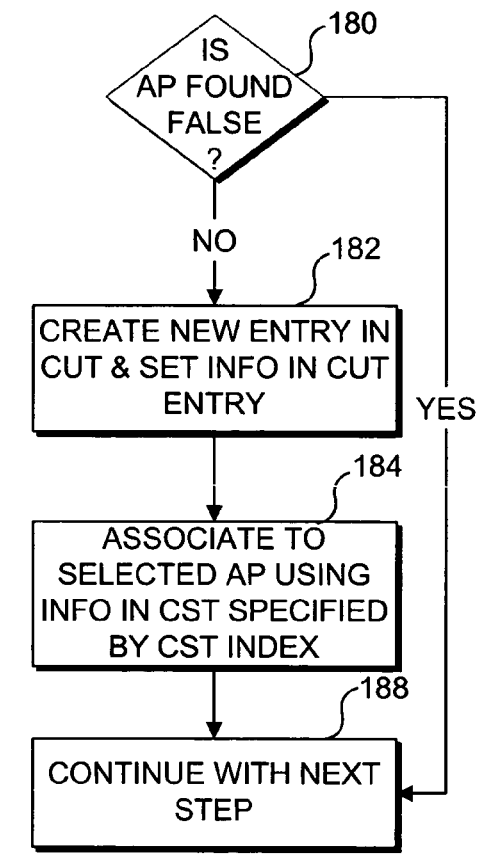

FIG. 5 is a schematic diagram of a more complex wireless network than that of FIG. 1A, wherein the present invention is employed so that wireless devices are automatically segregated into different wireless channels that communicate at different rates, convey different types of data, and are selectively automatically switched between infrastructure mode and ad hoc mode to convey data, as most appropriate;

FIG. 6 is a schematic diagram illustrating how a wireless device can operate as an AP or as a client device, and in either infrastructure mode or ad hoc mode;

FIG. 7 is a functional block diagram of a base station/wireless AP, or wireless device, as used in the present invention;

FIG. 8 is a flow chart showing the logic employed by an AP to automatically enable communication between two clients in ad hoc mode or infrastructure mode;

FIG. 9 is a high-level flow chart showing the logic employed to implement the present invention;

FIG. 10 is a flow chart showing the logic used to initialize a wireless system in accord with the present invention;

FIG. 11 is a flow chart showing the logic used to scan channels and record the data thus discovered, in a channel scan table (CST);

FIG. 12 is a flow chart showing the logic employed for configuring an AP list to permit legacy AP (LAP) communications;

FIG. 13 is a flow chart showing the logic employed for associating with the best LAP based on information in a AP List (APL) table; and FIG. 14 is a flow chart showing the logic employed for identifying a free channel for communication based on information in the CST.

DESCRIPTION OF THE PREFERRED EMBODIMENT

As explained above under the Background of the Invention section, one of the problems of the existing approach used for conveying data in a wireless network arises because wireless devices that are capable of communicating only at relatively slower rates, such as devices meeting the IEEE 802.11b standard, slow the communication of data over the entire network in regard to a base station or wireless AP that would otherwise be able to communicate with faster wireless devices meeting either the IEEE 802.11a or IEEE 802.11g standards. Furthermore, although the slower data rate may be entirely acceptable for certain types of data such as html data for web pages, which is often more limited by the download speed of a broadband connection to the Internet, other types of data such as video data packets require a higher data rate for acceptable performance on a wireless network. Therefore, one important aspect of the present invention is its allocation of different types of data transfer to specific different channels that may operate at different data rates, based upon the rate that is provided by a specific wireless device used on the channel and the type of data to be communicated.

Figure 4:
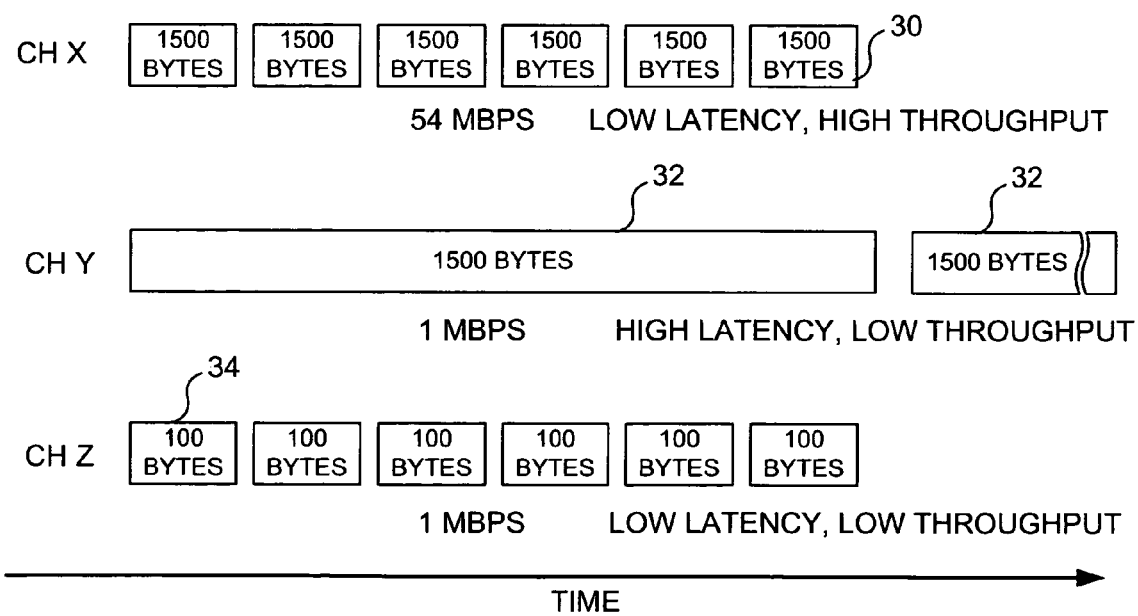
FIG. 4 is a schematic diagram showing the approach used in the present invention, wherein clients are segregated into different wireless channels based upon their bandwidth requirements and type of material being communicated.

FIG. 4 illustrates a simplistic example in which much more effective use is made of the available bandwidth by employing three different wireless channels X, Y, and Z for transmitting different types of data at different data rates. In this example, channel X is used for communicating 1500-byte packets 30 at a data rate of about 54 Mbps. Typically, universal data protocol (UDP) data packets are used for conveying compressed video from a media server to a display monitor so that the video can be uncompressed and viewed. A low latency, high throughput link like that provided by channel X is thus very appropriate for this type of data and can readily be achieved using the IEEE 802.11a standard, or the IEEE 802.11g standard. Channel Y is also used for conveying TCP/IP long packets 32 of 1500 bytes size, but at a substantially lower data rate of from one to two Mbps. Channel Y is achieved using, for example, the IEEE 802.11b standard and provides a high latency, low throughput, which is suitable for loading html or web page data, as noted above. Finally, channel Z is implemented using wireless devices operating for example at IEEE 802.11b data rates, but with relatively smaller UDP packets 34 of about 100 bytes each. The resulting low latency, low throughput is acceptable for voice-over-Internet protocol (VOIP) data transmissions, or for conveying game data used by game consoles that are coupled to the Internet, such as Microsoft Corporation's XBOX™ game console. By using different channels operating at different data rates and at different latencies, the most efficient use of the available bandwidth is thus achieved for the available wireless devices in a wireless network.

Referring now to FIG. 5, an exemplary wireless network is illustrated to show how the present invention can be employed to efficiently use the available bandwidth and the capabilities of different wireless devices that communicate at different data rates. It should be emphasized that FIG. 5 simply shows an example of such a network and is not intended to in any way be limiting of the present invention and its capabilities. Accordingly, although most of the clients coupled together in communication through wireless devices in FIG. 5 are PCs, it is emphasized that almost any type of electronic device suitable for communication over a wireless network can be included in such a network using the present invention. Thus, for example, although not shown in this Figure, a telephone handset that communicates over the Internet using VOIP may be coupled to the wireless network using a suitable wireless device. Also, it should be emphasized that the present invention is not in any way limited to communications using the IEEE 802.11 standards but instead, is applicable to almost any form of wireless communication, such as Bluetooth.

Just as in the conventional or prior art system shown in FIG. 1A, the wireless system of FIG. 5, which includes the present invention, includes wireless base station/Ethernet switch 12, which is coupled through cable or DSL modem 14 to Internet 16. Also included are PCs 18a and 22a, laptop 24, and PC 26a. PC 22a is connected through a wireless device (not separately shown) included in the PC to wireless base station/Ethernet switch 12 over a channel A using the IEEE 802.11g standard, while both laptop 24 and PC 26a employ wireless devices (not separately shown) that communicate with wireless base station/Ethernet switch 12 over a different channel D using the IEEE 802.11b standard. In addition, although laptop 24 and PC 26a are capable of communicating in the infrastructure mode with wireless base station/Ethernet switch 12, they can automatically be selectively enabled to couple in communication with each other in ad hoc mode. For example, PC 26a may store images made with a digital camera that a user operating laptop 24 wants to view on the laptop. As explained in greater detail below, the request to connect to the image data files stored on PC 26a may cause wireless base station/Ethernet switch 12 to selectively configure the wireless device in laptop 24 and the wireless device in PC 26a to operate in the ad hoc mode so that laptop 24 is directly coupled in wireless communication with PC 26a over channel E, which is different than channels A and D. Communication between laptop 24 and PC 26a does not interfere with the infrastructure mode communication between wireless base station/Ethernet switch 12 and PC 22a, because it occurs on a different channel.

In addition, the wireless network shown in FIG. 5 also includes a PC 40a having a monitor 40b and a keyboard 40c. PC 40a is coupled to an audio system and speakers 50. A PC 42a serving as a multimedia PC is coupled to PC 22a which serves as an audio/video server in regard to PCs 40a and multimedia PC 42a. Multimedia PC 42a is in turn connected to drive a television monitor 44 and is coupled through a wireless link to a wireless adaptor 46 through which a television monitor 48 is driven.

While not separately shown, audio/video server PC 22a includes two wireless devices and communicates with PC 40a using a channel C in an ad hoc mode and in accord with the IEEE 802.11g standard. Audio files are stored on a hard drive (not separately shown) in audio/video server 22a and are served to PC 40a for use in driving audio system and speakers 50. The other wireless device included in audio/video server PC 22a is coupled through a channel B in ad hoc mode and also communicates using IEEE 802.11g standard (or alternatively 802.11a). Video data that are stored on the hard drive of audio/video server 22a are conveyed over channel B, which is different than the other channels used in the wireless network shown in FIG. 5. The video data are used for displaying movies or other video or image files on television monitor 44 and may also be transmitted through an IEEE 802.11g (or 802.11a) link to wireless adaptor 46 for display on television monitor 48. Accordingly, since an appropriate data rate is used for conveying video and each of the other types of data used in the wireless network shown in FIG. 5, an efficient use is made of the available wireless communication bandwidth. In addition, where appropriate, use of ad hoc communication mode avoids the need to use a central AP for retransmission of data being conveyed between two wireless devices, since they are connected in direct communication using the ad hoc mode. However, if necessary, a client can be switched between infrastructure in which data are received from the Internet, to ad hoc mode, to convey that data to another wireless device that is out of range of the base station. Similarly, data from the wireless device that is out of range of the base station can be received by the client while operating in the ad hoc mode, and then after the client has switched back to the infrastructure mode, can be transmitted to the base station to enable the data to be sent out over the Internet. Thus, it will be evident that the approach used in the present invention provides much more efficient utilization of bandwidth and the resources of the wireless devices available in the network than the prior art.

FIG. 6 illustrates further details showing how the present invention achieves the QoS wireless communication capability that is required for serving audio and visual media to clients, while maintaining the capability of connecting to the Internet for accessing web page and other types of data including media data. In this simple example, a legacy wireless AP 60 is coupled through a broadband connection or a LAN to the Internet, or to other data sources on the LAN. In addition, legacy wireless AP 60 is connected through a legacy infrastructure link operating on channel Y to a client/media server 62 and to a data client 66. Thus, data client 66 can access the Internet or other information on the LAN through channel Y via the wireless AP. Similarly, as necessary, client/media server 62 can access such information through channel Y. In addition, however, client/media server 62 can selectively configure itself to function as an AP (i.e., as media server AP in this example) with its own sub-net of media clients 64a and 64b, or alternatively, as a client of legacy wireless AP 60. The client/media server determines the type of data to be transferred, and based upon the type of data, selectively configures itself as the media server AP serving media data to the media clients, or as a client device or station communicating with the legacy wireless AP. A different data rate (e.g., IEEE 802.11b or 802.11g) may be used by client/media server 62 when operating the media server AP, compared to when operating as the client of legacy wireless AP 60.

Media clients 64a and 64b can be connected to client/media server 62 in an infrastructure network operating on channel X, or alternatively, each media client can be connected through a separate channel to client/media server 62. If separate ad hoc connections are to be maintained simultaneously between the client/media server and both of the media clients, client/media server 62 will require two wireless devices so that each media client can operate on a different channel through a different wireless device in ad hoc mode.

Client/media server 62 adapts its buffering and communication methodologies to the limitations of the legacy link with legacy wireless AP 60 maintained through channel Y. This link is capable only of non-real time packetized transport of audio/visual content from the LAN or the Internet. Techniques such as "video trickle" or large jitter buffers for music/voice service are still possible through the legacy link. However, once the desired media files for video and/or audio are stored on client/media server 62, those files can be served up to media clients 64a and 64b by enabling client/media server 62 to change its protocols to act as a media server AP and employ full QoS bridging from the legacy link to the local media clients that it services either in infrastructure mode or ad hoc mode. Thus, the ability of the one or more wireless devices employed by client/media server 62 to selectively communicate in either infrastructure mode or ad hoc mode and to operate either as an AP or as a client device makes it feasible for one wireless device on the media server AP to handle data on multiple channels in a time-multiplexed fashion, or alternatively, to communicate through multiple ad hoc channels with different media clients without time multiplexing. As a further alternative, one wireless device might be employed to maintain the legacy link to legacy wireless AP 60, by operating in the client mode, while one or more other wireless devices on the client/media server is used for communication to media clients 64a and 64b, while operating as a media server AP to the media clients. The present invention thereby enables high bandwidth bridging to be accomplished from the legacy wireless AP through the client/media server to media clients 64a and 64b. This capability facilitates upgrading to the benefits of the present invention without the need to replace legacy APs and other legacy wireless devices that already are used in a network.

The present invention can be implemented using existing wireless devices without any hardware modification. An exemplary block diagram of such a wireless device is illustrated in FIG. 7. In this block diagram, a processor 65 is coupled to a memory 67 in which machine instructions are stored that facilitate the operation of the wireless device when the machine instructions are executed by the processor. Processor 65 is also coupled to an Ethernet transceiver 68 (or to a PC Card, Cardbus, mini-PCI, ExpressCard, if the wireless device is a card designed for use with a laptop) or a peripheral component interconnect (PCI) bus interface if used as an internal wireless card in a PC. If the wireless device is used as a base station, processor 65 will also be coupled to a wide area network interface 77. The base station may also include Ethernet switch capability, and if so, a plurality of Ethernet ports that are part of an Ethernet switch module 75 are included. A media access controller (MAC) and physical (PHY) layer transceiver 69 provides an interface between processor 65 and a transmitter/receiver 71, used for transmitting and receiving signals via one or more antenna(e) 73. Since wireless devices are well known to those of ordinary skill in the art, further details of the functionality and operation of the device need not be set forth herein. It will also be understood that the machine instructions loaded into memory 67 as firmware can readily be updated to accommodate any desired additional functionality to implement the present invention.

Turning now to FIG. 8, the logical steps used for selectively automatically switching a wireless device between operation in the ad hoc mode and the infrastructure mode are illustrated. In this flowchart, as indicated in a step 70, it is assumed that the two wireless devices are in communication with a base station or wireless AP using the infrastructure mode on channel A. In a step 72, either client A or client B sends a request to the AP to communicate with the other in the ad hoc mode, i.e., as a result of the user taking some action that requires the clients to communicate data. A decision step 74 determines if the clients are within range of each other to facilitate such communication. If not, a step 76 provides for denying the request, and as a result, as indicated in a step 78, client A and client B continue to communicate with the AP using the infrastructure mode. The logic is then complete.

Alternatively, assuming that the two clients are within range of each other to facilitate communication in the ad hoc mode, a step 80 indicates that the AP provides channel security parameters to the two clients and indicates whether the change to ad hoc mode will be viewed as permanent or transitory. In this sense, the term "permanent" applies until an active step is taken to change the mode, while the term "transitory" might apply for a single data communication. A step 82 then indicates that the AP updates its routing table to reflect that clients A and B can communicate with each other in ad hoc mode. Next, a step 84 provides for setting up clients A and B to connect on a wireless channel B with the parameters that were provided by the AP so that the communication in ad hoc mode is initiated.

Once client A and client B are communicating with each other in the ad hoc mode, a decision step 86 determines if at some point, either client needs to communicate with the AP. If not, a step 88 continues the ad hoc mode of communication between the two clients. However, should either client need to communicate with the AP, in response, for example, to a user selecting an option that requires connection to the Internet, a step 90 terminates the ad hoc mode and changes the two devices to operate in infrastructure mode. Next, a step 92 enables communication with the AP in infrastructure mode on channel A. A decision step 94 determines if either client needs to communicate with the other, and if not, communication continues in the infrastructure mode as noted in step 92. However, if either client again indicates a need to communicate with the other, in ad hoc mode, the logic loops back to step 84, in which the two clients are coupled in communication via ad hoc mode.

When a client/media server is employing the present invention as discussed above in connection with FIG. 6, it employs smart logic to determine how to use its wireless device(s) for communicating with its media clients and with the LAP. Since the wireless device(s) used by the media server are frequency agile, the media server can scan the wireless radio bands (2.4 GHz for the IEEE 802.11g/b standard and/or 5 GHz for the IEEE 802.11a/h standard) and thereby determine the radio frequencies that should be used for the communication. In this process, the media server has to initially find any LAP with which it will communicate using radio channel A and must select a suitable radio channel B (or more than one such channel) for communicating with its clients. When operating as a client, the client/media server must scan available radio stations to find the link to the LAP. Conversely, when operating as a media server AP, the media server must select a clear channel over which to communicate with its media clients. The data structure illustrated in Tables 1, 2, and 3 is stored within the software or firmware of the client/media server associated with the wireless system, for each radio channel.

TABLE 1

Channel Scan Table (CST) Entries (64 Bytes Long)
(One table entry for each Wi-Fi radio channel available
for operation, as limited by the country
domain - see TABLES 4 and 5.)

| | | |
|---|---|---|
| RF Band | [2 bits] | (0=not used, 1=2.4 GHz, 2=5 GHz) |
| Channel # | [6 bits] | (0=not used, 1...63 logical channel #) |
| RF Energy | [8 bits] | (−128...+127 dBm measured by RF circuitry) |
| 802.11 Signal | [8 bits] | (−128...+127 dBm measured by baseband processor) |
| Beacon Info | [8 bits] | (copied from beacon) |
| BSSID | [32 chars] | (copied from beacon) |
| MAC Address | [6 bytes] | (copied from beacon) |
| Security Key | [128 bits] | |
| Security Mode | [4 bits] | (0=no security, 1=WEP, 2=WPA) |
| Use OK | [1 bit] | (0=do not use, 1=OK to use) |
| Scanned | [1 bit] | (0=not scanned, 1=scanned) |
| Future Use | [42 bits] | |

TABLE 2

Channel Use Table (CUT) Entry (4 Bytes Long)
(One table entry for each radio channel actively
used for communication.)

| | | |
|---|---|---|
| CST Index | [8 bits] | (entry index 0...255 into Channel Scan Table) |
| Type | [4 bits] | (0=not in use, 1=station to LAP, 2=MAP) |
| QoS | [4 bits] | (0=no QoS, 1=voice, 2=music, 3=low res video, 4=SDTV, 5=HDTV) |
| TX Power | [4 bits] | (0=full power, 1...15 power reduction) |
| Future Use | [12 bits] | |

TABLE 3

AP List (APL) (4 Bytes Long)
(Information about APs detected.)

| | | |
|---|---|---|
| Best Signal | [8 bits] | (802.11 signal −128...+127 dBm measured by baseband processor) |
| Least RF | [8 bits] | (802.11 signal −128...+127 dBm measured by baseband processor) |
| Best AP Index | [8 bits] | (entry index 0...255 into Channel Scan Table) |
| Best Chan Index | [8 bits] | (entry index 0...255 into Channel Scan Table) |
| AP Found | [1 bit] | (0=no AP found, 1=found an AP) |
| Free Chan | [1 bit] | (0=no Free channel found, 1=found free channel) |

Different countries employ different frequency ranges, channels, and maximum output power for the IEEE 802.11g/b and the nominal 2.4 GHz frequency band, as indicated below in Table 4.

TABLE 4

802.11b/g 2.4 GHz Frequency Bands by Country

| Countries | Frequency Range | Channels | Maximum Output Power |
|---|---|---|---|
| U.S., Canada | 2.412 GHz-2.462 GHz | 1-11 | 1000 mW |
| ETSI Europe | 2.412 GHz-2.472 GHz | 1-13 | 100 mW |
| Japan | 2.483 GHz | 14 | 10 mW/MHz |
| France | 2.457 GHz-2.472 GHz | 10-13 | 100 mW |
| Spain | 2.457 GHz-2.462 GHz | 10-11 | 100 mW |

Similarly, different countries or regions employ different frequency ranges, channels, and maximum output power levels for the IEEE 802.11a/h nominal 5 GHz frequency bands, as indicated below in Table 5.

TABLE 5

802.11a/h 5 GHz Frequency Bands by Country

| Countries | Frequency Range | Channel Numbers | Maximum Output Power |
|---|---|---|---|
| USA | 5.180 GHz-5.240 GHz | 36, 40, 44, 48 | 50 mW |
| USA | 5.25 GHz-5.35 GHz | 52, 56, 60, 64 | 250 mW |
| USA | 5.7245 GHz-5.8025 GHz | 149, 153, 157, 161 (Outdoor applications) | 1 W |
| Europe | 5.180 GHz-5.320 GHz | 36, 40, 44, 48, 52, 56, 60, 64 | 200 mW |
| Europe | 5.500 GHz-5.700 GHz | 100, 104, 108, 112, 116, 120, 124, 128, 132, 136, 140 | 1 W |

TABLE 5-continued

802.11a/h 5 GHz Frequency Bands by Country

| Countries | Frequency Range | Channel Numbers | Maximum Output Power |
|---|---|---|---|
| Japan | 4.900 GHz-5.100 GHz | (Planned) | 200 mW |
| Japan | 5.180 GHz-5.240 GHz | 36, 40, 44, 48 | 200 mW |
| Korea | 5.725 GHz-5.825 GHz | 149, 153, 157, 161 | 1 W |

Note:
For the 5 GHz 802.11 radio band, the Freq. (MHz) = 5000 × Channel Number.

The logic employed by a media server for selectively communicating in an infrastructure mode with a LAP, while communicating with its media clients either in an infrastructure mode or in an ad hoc mode, is illustrated in FIG. 9. Following the start of the logic, a step 100 provides for initializing the wireless network. Details of this step are illustrated in FIG. 10.

In a step 120 of FIG. 10, the media server sets the CUT to all zero bits, which also sets all associated Boolean flags to false. A step 122 then sets the APL to all zero bits, which also sets all related Boolean flags to false. A step 124 sets the CST to all zero bits, and also sets all related Boolean flags to false. Next, in a step 126, for each country of the CST, the media server fills in the radio frequency band/channel number fields with valid pairs of data as determined by the country domain for the country in which the media server is operating. The data shown in Tables 4 and 5 are maintained in a nonvolatile configuration memory of the wireless devices used on the media server, which can be updated as country regulations change.

Referring back to FIG. 9, a step 102 discovers the status of the channels on the wireless network. During this step, the media server passively listens to each valid radio channel and records information regarding the channels into the CST. Details of this step are illustrated in FIG. 11.

At a step 130 in FIG. 11, the media server starts at the first entry of the CST. Next, in a step 132, the media server reads the radio frequency (RF) band and the channel number as a pair of data. Using that data in a step 134, the media server programs the Wi-Fi wireless device to listen to the RF band and channel number that were read in step 132.

A step 136 records the data in the current CST entry. These data include the RF energy or [signal-to-noise ratio (RF energy)], the 802.11 signal strength or [signal-to-noise ratio (802.11 signal)], the IEEE 802.11 beacon information [beacon info], the BSSID, which is received from the beacon packet [BSSID], a MAC address, which is received from the beacon packet [MAC address], and the security method, which is determined from the beacon or other control packet (S) [security]. Next, a step 138 provides for marking the channel as scanned. The media server then determines whether it is at the end of the CST at a step 140, and if so, the logic is completed. However, if not, a step 142 increments the CST table entry number and then returns to step 132 to complete the next entry in the CST.

Again referring back to FIG. 9, a step 104 provides for configuring the APL to enable LAP communication. Details of step 104 are illustrated in FIG. 12. Starting at a step 150 in FIG. 12, the media server initializes data for the APL information by setting the variable "AP Found" to false and setting the variable "Best Signal" to −128 dBm. A step 152 then provides for starting at the first entry of the CST. A decision step 154 determines if the current channel is usable. This step looks at the variable "Scanned" to determine if the channel has been scanned, and also determines if the variable "RF Energy" is less than an RF minimum that has been predefined, or if the variable "802.11 signal" is less than a predefined 802.11 minimum value, or if the variable "Beacon Info" is not valid. If any of these conditions cause the current channel to be found not usable, the logic proceeds to a decision step 160, which determines if the logic has reached the end of the CST. If so, this portion of the logic is complete. If not, a step 162 provides for incrementing the CST entry number, and the logic then loops back to decision step 154. If the current channel is found to be usable in decision step 154, a step 156 presents the information for the current CST entry to the user, who can select whether a particular access point should be ignored or used for association. This step also computes the [Best Signal] for AP channels that are acceptable to the user. If the user does not want to use the current access point, the logic proceeds from decision step 158 to decision step 160, as discussed above. However, if the user decides to use the current access point, a step 164 sets the variable "Use" to True. Next, a decision step 166 determines if the value of "802.11 signal" is greater than the variable for "Best Signal" that is stored in the APL, and if so, a step 168 sets the variable "AP Found" to True, the variable "Best Signal" to 802.11 signal, and sets the variable "Best AP Index" to the current CST entry number. If decision step 166 determines that the value of "802.11 signal" is greater than the variable for "Best Signal" that is stored in the APL, steps 168 and 170 are skipped, and the flow of logic continues with step 160. After step 168, a step 170 asks the user for the security key and then sets the variable "security key" in the current CST entry number to the value specified by the user. The logic then proceeds to decision step 160 and continues as described above.

Referring back to FIG. 9, a step 106 identifies the best legacy access point with which to associate for communication. Details of this step are illustrated in FIG. 13. During this step, the media server uses the application point information in the APL to associate to the best legacy access point. As shown in FIG. 13, a decision step 180 determines if the "access point found" variable is false, and if not, a step 182 creates a new entry in the CUT and sets the information in the new CUT entry. Specifically, the variable "CST Index" is set to the variable "Best AP Index" in the APL, the variable "Type" is set to the station, the variable "QoS" is set to No, and the variable "TX Power" is set equal to Full.

Next, a step 184 associates the media server to the selected access point as a station or client using the information in the CST specified by the variable CST Index. Specifically, in this step, the media station tunes the wireless device to the RF band/channel number for the selected access point, waits for an appropriate idle channel to develop, issues a probe request, and performs any other steps that are common to associating a client with an 802.11 application point, as are well known to those of ordinary skill in the art. Thereafter, in a step 188, which is also reached if the variable AP Found is equal to false, the logic continues with step 108 in FIG. 9.

In step 108 of FIG. 9, the media server offers to provide access point services to its clients. This step uses the information in the CST to select an unused radio channel and then uses it for media communications with the media clients by the media server access point. Radio channels are chosen to reduce potential interference, thereby improving communication reliability. Specifically, the media server will select a 5 GHz channel that is free and has the least amount of existing RF signal strength, or alternatively will select a free 2.4 GHz channel with the least amount of RF signal strength. Details of this step are illustrated in FIGS. 14A and 14B, starting at a step 190 in FIG. 14A.

Figure 14A:
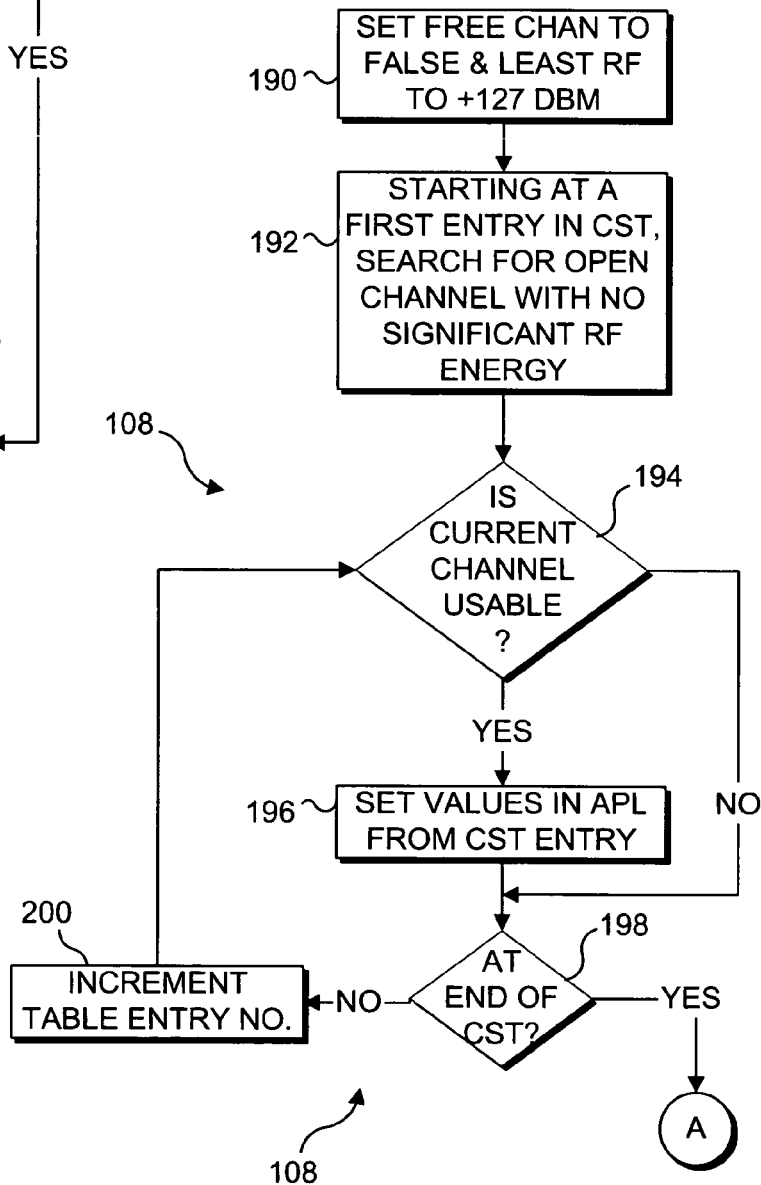

In step 190 of FIG. 14A, the media server sets the value for the variable "Free Chan" to False and the variable "Least RF" equal to +127 dBm. Next, in a step 192, the media server searches for an open channel with no significant existing RF energy. As indicated in a step 192, the media server starts at the first entry of the CST for an open channel with no significant RF energy. A decision step 194 determines if the current channel is usable. Again, the same types of tests are carried out as discussed above in connection with identifying a channel for the legacy access point. Specifically, the media server determines if the variable "Scanned" is equal to True and if the variable "RF Energy" is less than the predefined RF minimum, and if the variable "802.11 Signal" is less than a predefined "802.11 Minimum," and if the variable "Beacon Info" is not Valid. If all of these conditions are met, then the channel is usable. If the current channel is usable, a step 196 sets the values in the APL based upon the CST entry. In this step, the variable "Free Channel" is set to True and if the variable "Least RF" is greater than the RF Energy that was found, the media server sets the variable "Least RF" equal to the value of "RF Energy" and sets the variable "Best Chan Index" equal to the current CST entry number.

A decision step 198 determines if the logic is at the end of the CST and if not, a step 200 increments the table entry number before looping back to decision step 194. If decision step 198 indicates that the end of the CST has been reached, the logic continues (through a connector "A") with a decision step 202 in FIG. 14B.

Figure 14B:
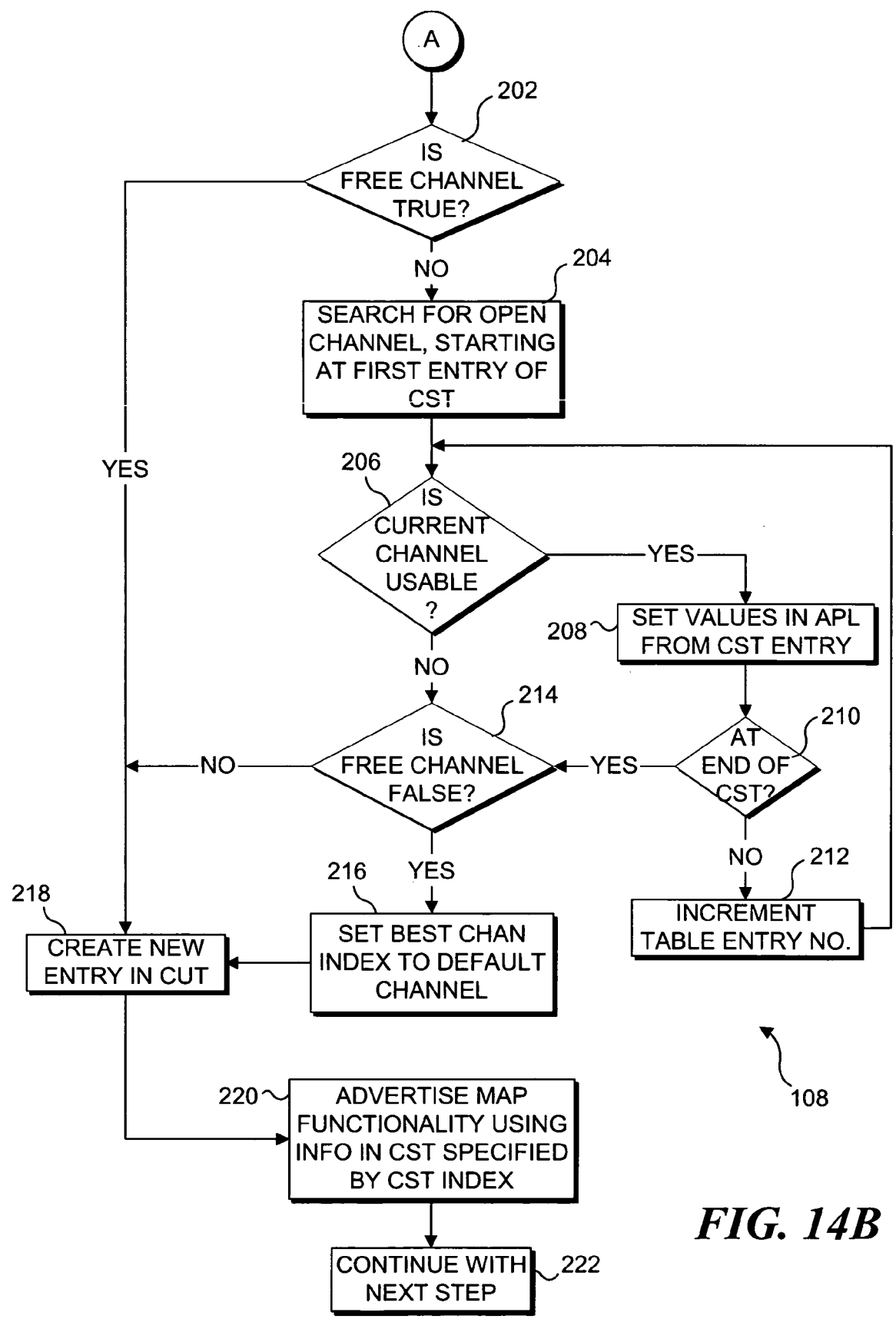

Continuing on in FIG. 14B, in decision step 202, the logic determines if the variable "Free Channel" is equal to True. If so, then the logic flow continues with a step 218. If not, a step 204 starts at the first entry of the CST to search for an open channel with no significant 802.11 signal. A decision step 206 determines if the variable "Scanned" is equal to True and if the variable "802.11 Signal" is less than a predefined "802.11 Minimum," and if the variable "Beacon Info" is not Valid. If all of these conditions are met, then the channel is usable, and if so, the logic sets the values in the APL from the CST entries at a step 208. If any of the conditions is not met, the logic proceeds with decision step 214, which is discussed below. Following step 208, a decision step 210 then determines if the logic has reached the end of the CST and if not, a step 212 increments the table entry number before looping back to decision step 206.

If decision step 210 determines that the end of the CST has been reached, then the logic proceeds to decision step 214, which determines if the variable "Free Channel" is equal to False, and if so, proceeds to a step 216. Step 216 sets the variable "Best Chan Index" to a default channel, such as 1. The logic flow then proceeds to a step 218.

A negative response to decision step 214 also leads to step 218, which creates a new entry in the CUT. Finally, a step 220 advertises the media access point functionality to the media clients of the media server using information in the CST specified by the CST Index. In this step, the media access point server tunes its wireless device(s) to the specified RF band/channel number, issues an 802.11 Beacon, and performs any other steps that are common to operating as an access point, again as well know to those of ordinary skill in the art. The logic then continues with the next step in FIG. 9, as indicated by a step 222 in FIG. 14.

Referring again to FIG. 9, a step 110 provides data communication between the media server and the media clients and/or communication between the client/media server and the LAP. In this step, data packets are sent/received on multiple radio channels as designated in the CUT. QoS data channels on the media access point server take priority over non-QoS channels in communicating with the LAP. A jitter buffer sizing algorithm sets the jitter buffer sizes on the LAP channel to compensate for any bottle necks that might be caused by non-QoS operation on the LAP, and priority operation of the media access point before communicating with the LAP.

A step 112 in FIG. 9 initiates rediscovery and reconfiguration. Periodically, or as needed (such as when signal quality or throughput decreases on an active channel), this step causes step 102 to be rerun, which is followed by implied changes to the CUT. If the media access point server needs to change channels, it can then instruct its media clients to do so. This functionality is clearly an enhancement to the IEEE 802.11 control methodology.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method in a wireless network comprising a wireless access point and a plurality of wireless devices wherein each wireless device may operate in a plurality of wireless communication modes, the method for making more effective use of an available wireless communication bandwidth, the method comprising:
   (a) the access point communicating with both a first wireless device and a second wireless device on a first wireless channel, in an infrastructure mode;
   (b) determining a type of data to be communicated over the wireless network;
   (c) when the data is a first type, selectively operating the first wireless device as a client wireless device that is coupled in wireless communication with the wireless access point over the first wireless channel;
   (d) when the data is a second type, selectively operating the first wireless device as a surrogate access point that is coupled in wireless communication with at least one other wireless device over a second wireless channel which is different than the first wireless channel; and
   (e) when determining that the first wireless device and the second wireless device are within range of each other to facilitate direct communication, the access point sending a signal on the first wireless channel, the signal causing the first wireless client device and the second wireless client device to establish direct communications on the second wireless channel.

2. The method of claim 1, further comprising selectively operating the first wireless device in one of an ad hoc mode and an infrastructure mode when communicating over the wireless network with the at least one other wireless device.

3. The method of claim 1, further comprising selectively operating the first wireless device at a different data rate and on a different channel when operating the first wireless device as the client wireless device, as when operating the first wireless device as the surrogate access point.

4. A wireless device for making more effective use of an available wireless communication bandwidth, comprising:
    (a) a memory in which machine instructions are stored;
    (b) a wireless transmitter and receiver configured to transmit and receive on a plurality of different wireless channels;
    (c) a processor that is coupled to the memory and upon which executes the machine instructions to carry out the method of claim 1.

5. The wireless device of claim 4, wherein the machine instructions are further operative to cause the processor to selectively operate the wireless device in one of an ad hoc mode and an infrastructure mode when communicating over the wireless network with at least one other wireless device.

6. The wireless device of claim 4, wherein the machine instructions are further operative to cause the processor to selectively operate the wireless device at a different data rate and on a different channel when operating the wireless device as a client device than when operating the wireless device as the surrogate access point.

7. A wireless access point that controls wireless client devices so as to efficiently use available bandwidth for wireless communications over a network, comprising:
    (a) a memory in which machine instructions are stored;
    (b) a radio comprising a wireless transmitter and receiver configured to transmit and receive on a plurality of different wireless channels;
    (c) a processor that is coupled to the memory and which executes the machine instructions to carry out a plurality of functions, including:
        (i) the access point communicating with both a first wireless client device and a second wireless client device on a first wireless channel, in an infrastructure mode;
        (ii) the access point receiving a request for the first wireless client device to communicate directly with the second wireless client device;
        (iii) the access point determining that the first client device and the second client device are within range of each other to facilitate direct communication;
        (iv) the access point sending a signal on the first wireless channel, the signal causing the first wireless client device and the second wireless client device to establish direct communications on a second wireless channel which is different than the first wireless channel.

8. The wireless access point of claim 7, wherein the wireless access point updates its routing table to reflect that the first client and the second client communicate directly to each other.

9. The wireless access point of claim 7 wherein the processor causes the first wireless client device to retransmit data received from the wireless access point on the first wireless channel, to the second wireless client device over the second wireless channel.

10. The wireless access point of claim 7, wherein the signal sent of the first wireless channel comprises channel security parameters and indicates whether the establishment of direct communications will be viewed as transitory.

11. The wireless access point of claim 7, wherein the the data communicated by the first client device and the second client device on the second wireless channel comprises at least one of:
    (a) music data;
    (b) video data;
    (c) gaming data; and
    (d) voice data.

12. The wireless access point of claim 7, wherein the wireless access point communicates one type of data to at least one of the first wireless client device and the second wireless client device, said one type of data being substantially different than data communicated between the first wireless client device and the second wireless client device.

13. The wireless access point of claim 7 wherein the wireless access point communicates with at least one of the first wireless client device and the second wireless client device using a substantially different data rate than a data rate used for communication between the first wireless client device and the second wireless client device.

14. A method in a network which includes a wireless access point and at least a first pair of wireless client devices and a second pair of wireless client devices, the method for efficiently communicating data over a wireless network, comprising:
    (a) for each pair of wireless client devices, for data being communicated between the each pair of wireless devices over the wireless network, determining at least one parameter from the following:
        (i) a use for the data being communicated between specific wireless devices;
        (ii) a size of data packets to be communicated between specific wireless devices;
        (iii) a frequency band with which the data will be communicated;
        (iv) a nominal data rate with which the data will be communicated; and
        (v) a latency with which the data will be communicated;
    (b) as a function of the at least one parameter,
        causing the first pair of wireless devices to communicate simultaneously over a first wireless channel,
        causing the second pair of wireless devices to communicate over a second wireless channel,
        the first wireless channel being used to communicate a first type of data between the first pair of wireless devices,
        the second wireless channel being used to communicate a second type of data between the second pair of wireless devices, and
        the second wireless channel being different than the first wireless channel;
    (c) automatically enabling communication in an ad hoc mode between selected pairs of wireless devices that are communicating the same type of data; and
    (d) automatically enabling communication in an infrastructure mode for wireless devices that include the wireless access point.

15. The method of claim 14, further comprising automatically changing selected wireless devices between communicating using the ad hoc mode and communicating using the infrastructure mode in response to the type of data being transferred between the selected wireless devices.

16. The method of claim 14, wherein the first and second types of data include at least two of:
    (a) music data;
    (b) video data;
    (c) gaming data;
    (d) voice data; and
    (e) web page data.

17. The method of claim 14, further comprising the step of coupling at least one wireless device to an external network through a wired connection so that data from the external network can be communicated selectively to at least one other wireless device in one of the infrastructure mode and the ad hoc mode.

18. The method of claim 14, further comprising, automatically selectively operating at least one of the wireless devices as a wireless access point when a first type of data is to be communicated and as a wireless client device when a second type of data is to be communicated.

19. The method of claim 14, further comprising automatically grouping together wireless devices which are using a first wireless standard for communication and grouping other wireless devices which are using a second wireless standard for communication, where the second wireless standard is different than the first wireless standard.

20. The method of claim 14, wherein a wireless device that comprises a wireless access point controls other of the wireless devices to carry out steps (b) through (d).

21. The method of claim 14, wherein the step of automatically enabling communication in an ad hoc mode between selected wireless devices employs substantially all of a bandwidth of the wireless channel on which the selected wireless devices are communicating.

22. A computer-readable medium encoded with computer-executable instructions for carrying out the method of claim 14.

* * * * *